Patented Sept. 11, 1928.

1,683,631

UNITED STATES PATENT OFFICE.

HENRY STANLEY, OF GALVESTON, TEXAS.

EGG-PRESERVING COMPOUND.

No Drawing.  Application filed February 12, 1927.  Serial No. 167,866.

The present invention has reference to an improved compound which is especially, but not necessarily, prepared for preserving eggs.

It seems well established that eggs, which are subject to rapid decomposition, can be preserved for a comparatively long time in a vacuum produced in a container or vessel from which the air has been exhausted. It is maintained, however, that this is, ordinarily, not a practicable method and means for maintaining eggs in an edible condition, because it is entirely too expensive and otherwise objectionable.

What I propose is an improved compound, or mixture of material, adapted to operate as a packing and coating for eggs which will operate in a manner to render the shells substantially moisture and air-proof and nearly impervious to air, whereby to preserve the natural properties of the eggs for an indefinite period of time.

The improved compound or composition of matter embodies the following ingredients, viz:—

| | Per cent. |
|---|---|
| Wheat bran | 92.76 |
| Sodium chloride (salt) | 7.01 |
| Yellow ochre mineral | 0.23 |

The foregoing ingredients are simply mixed together in an appropriate container including a suitable agitator.

The action of this mixture as a preservative is both mechanical and chemical, in that the salt or sodium chloride preserves the bran, thus preventing it from becoming moldy and in turn the mixture, when used as a packing for eggs, acts in the manner of an insulator preventing great fluctuation of temperature or the great overheating of the eggs. The ochre mineral, added in a very fine powder form, acts mechanically in that it helps to fill the pores of the eggs of the shell, thus acting in conjunction with the bran to exclude air and to prevent the evaporation of the water in the egg. The bran also operates to absorb dampness.

While the ingredients do not react upon each other to change their identity, they inter-act in the manner indicated to produce what is believed to be an excellent preservative for the eggs. Particularly will it be noted that when eggs are packed in a substantially air-tight vessel containing this compound, they will retain their freshness and original natural appearance for an indefinite period of time.

I claim:—

The herein described egg preserving compound comprising a mixture of wheat bran, sodium chloride, and mineral ochre, the mineral ochre being adapted to fill the pores of the egg shell to exclude air and serve as an insulator without bringing about heating of the eggs, and being also adapted to prevent the evaporation of water from the eggs, and to preserve the bran and to assure the bran retaining its preservative properties.

In testimony whereof I affix my signature.

HENRY STANLEY.